United States Patent
Wall

(10) Patent No.: US 6,431,487 B1
(45) Date of Patent: Aug. 13, 2002

(54) SPOOLER

(76) Inventor: John R. Wall, 440 W. Greene St., Carmichaels, PA (US) 15320

(*) Notice: Subject to any disclaimer, the term of this patent is extended or adjusted under 35 U.S.C. 154(b) by 0 days.

(21) Appl. No.: 09/605,570

(22) Filed: Jun. 28, 2000

(51) Int. Cl.⁷ .......................... B65H 77/00; B25B 25/00
(52) U.S. Cl. ............................. 242/388.2; 242/388.4; 254/213
(58) Field of Search ...................... 242/388.2, 388.4, 242/388.1; 28/358; 256/35; 254/213; 24/71.2, 71 R

(56) References Cited

U.S. PATENT DOCUMENTS

| | | | |
|---|---|---|---|
| 75,759 A | * 3/1868 | Hewett | 242/388.2 |
| 126,939 A | 5/1872 | Denmark et al. | |
| 227,443 A | * 5/1880 | Murray | 242/388.3 |
| 290,384 A | * 12/1883 | Atwood | 242/388.2 |
| 327,126 A | 9/1885 | Walker | |
| 403,977 A | 5/1889 | Wickers et al. | |
| 430,581 A | * 6/1890 | Kiler | 242/388.2 |
| 479,817 A | 8/1892 | Kramer | |
| 491,743 A | * 2/1893 | Pratt | 242/388.2 |
| 497,996 A | 5/1893 | Weiennett | |
| 500,033 A | 6/1893 | Patton | |
| 540,125 A | * 5/1895 | Walton | 242/388.2 |
| 543,853 A | 8/1895 | Davis | |
| 545,255 A | 8/1895 | Stauffer | |
| 565,916 A | * 8/1896 | McKee | 256/35 |
| 567,367 A | * 9/1896 | Truelsen | 242/388.2 |
| 614,581 A | * 11/1898 | Shown | 24/68 B |
| 638,298 A | * 12/1899 | Tittle | 242/388.2 |
| 642,462 A | * 1/1900 | Kimmel | 242/388.2 |
| 669,506 A | * 3/1901 | Clark | 242/388.2 |
| 708,196 A | * 9/1902 | Bradbury | 254/223 |
| 795,286 A | 7/1905 | Knox | |
| 839,311 A | * 12/1906 | Nepean-Hutchison | 242/388.2 |
| 931,486 A | 8/1909 | Rankin | |
| 963,659 A | 7/1910 | Stambaugh | |
| 973,034 A | * 10/1910 | Graham | 242/388.2 |
| 1,264,011 A | * 4/1918 | Caughey | 24/71 R |
| 1,982,444 A | * 11/1934 | Miller | 242/388.2 |
| 2,051,735 A | * 8/1936 | Michelson | 242/372 |
| 2,642,639 A | 6/1953 | Meighan et al. | |
| 2,710,998 A | 6/1955 | Meighan et al. | |
| 4,072,278 A | 2/1978 | Petersen | |
| 4,700,434 A | * 10/1987 | Fambrough | 242/388.2 |
| D300,205 S | * 3/1989 | Watson | D8/358 |
| D390,093 S | * 2/1998 | Spear et al. | D8/358 |
| 6,070,823 A | * 6/2000 | Clary | 242/388.1 |
| 6,102,321 A | * 8/2000 | Clary | 242/388.4 |

FOREIGN PATENT DOCUMENTS

GB 2224477 A * 9/1990 ................. 254/213

* cited by examiner

*Primary Examiner*—Donald P. Walsh
*Assistant Examiner*—Daniel K Schlak
(74) *Attorney, Agent, or Firm*—Webb Ziesenheim Logsdon Orkin & Hanson, P.C.

(57) ABSTRACT

A spooler for tensioning a fence rail includes a hub with an aperture. The aperture receives the rail such that the rail may pass through the hub. Each of a pair of cup-shaped discs has a plurality of openings in the bottom. The discs are located at each end of the hub and face away from each other. At least one drive is located on one of the discs and receives a driver. A rim of the disc extends to be at least flush with the end portion of the drive. At least one locking pin is adapted to be inserted into one opening in each disc. When the at least one locking pin is fully inserted, the sides of each disc extend beyond ends of the at least one locking pin.

9 Claims, 2 Drawing Sheets

SPOOLER

BACKGROUND OF THE INVENTION

1. Field of the Invention

This invention relates to fencing, and more particularly to spoolers for tensioning fence rails comprised of plastic ensheathed metal wires.

2. Description of the Prior Art

Spoolers (or stretchers) for tightening fence rails or wires are well-known in the art. It is common for a spooler to have a central post or hub through which a wire is inserted. The spooler typically has a disc or similar structure located at either end and a drive mechanism for winding the wire around the spooler. U.S. Pat. Nos. 126,939; 2,642,639; and 2,710,998 are typical spoolers of this type.

However, current spoolers have various configurations which are injurious to people and animals that impact them. Conventional spoolers have the drive mechanism, the locking pins, or other components exposed which can easily cause injury to whatever comes into contact with them. Additionally, the discs or disc-like structures used on the spoolers have exposed sharp edges that may also cause damage through contact.

Therefore, there is a need to develop a spooler that is functional while safe to people, animals, etc. that may come into contact with the spooler.

SUMMARY OF THE INVENTION

It is an object of this invention to provide a spooler that will not cause harm to people, animals, or other objects when impact occurs with the spooler.

The spooler according to the present invention has a hub, a pair of discs, at least one drive, and at least one locking pin. The hub is an elongated member having opposed ends. The hub also includes an aperture that is configured to receive a continuous type fencing rail, preferably a rail of the type having plastic ensheathed metal wires as typically used for fencing in livestock, such as horses and ponies. However, other types of fencing rail may be used, for example, an all plastic rail as found in plastic strapping or banding material. The aperture in the hub permits the rail to pass through the hub. The hub may be any of several geometric cross-sections.

One disc is located at each end of the hub. Each disc is generally cup-shaped having a bottom and a rim extending substantially perpendicular to the bottom. A joint defined by the joining of the rim and the bottom may be rounded to protect people and animals from harm when contacting the spooler. The discs are positioned on the hub such that the rims extend away from each other. Each disc bottom includes a plurality of openings encircling the bottom near an outer circumference of the bottom.

At least one drive is provided to receive a driver for use in tensioning the rail. The drive may have holes to receive a locking ball of a conventional drive ratchet handle. Upon engagement of the locking ball in the holes, the driver is secured in the drive to inhibit disengagement during tensioning. Preferably, one drive is located on each disc and two drivers may be used. The drive is located on the disc facing away from the hub. The rim of the disc extends approximately a same distance as a height of the drive. In this configuration, the drive will not be protruding from the spooler. Thus, if people or animals contact the spooler, the drive will not cause injury.

At least one locking pin is insertable into and removable from one of the plurality of openings in each disc. The locking pin prevents the spooler from unwinding after the desired tension has been achieved in the rail. Preferably, the spooler is installed on the rail such that the locking pin does not require any special device to hold it in place. When the locking pin is fully inserted into the openings, the rims of each disc extend beyond ends of the locking pin. In this configuration, the locking pin is not exposed from the spooler. Thus, if people or animals contact the spooler, no protruding ends of the locking pin will cause harm.

In use, the rail is passed through the aperture in the hub. The driver engages the drive and rotates the spooler, winding the rail about the hub in order to increase the tension of the rail. Once the desired tension is achieved, the locking pin is inserted into one of the plurality of openings in each of the pair of discs to prevent unwinding of the spooler. Preferably, two locking pins are used to lock the spooler in place. Once the locking pin is in place, the driver is removed. Since the driver is removed from the spooler after tensioning, an exposed driver will not harm people or animals contacting the spooler. To relieve the tension in the rail, the driver is used to rotate the spooler until tension is removed from the locking pin, then the locking pin is removed, and the rail is unwound from the spooler.

The spooler may also be used to join two rails together or to attach the rail to an end post.

BRIEF DESCRIPTION OF THE DRAWINGS

Further features and other objects and advantages will become apparent from the following detailed description made with reference to the drawings in which.

DESCRIPTION OF THE PREFERRED EMBODIMENTS

Figure 1:
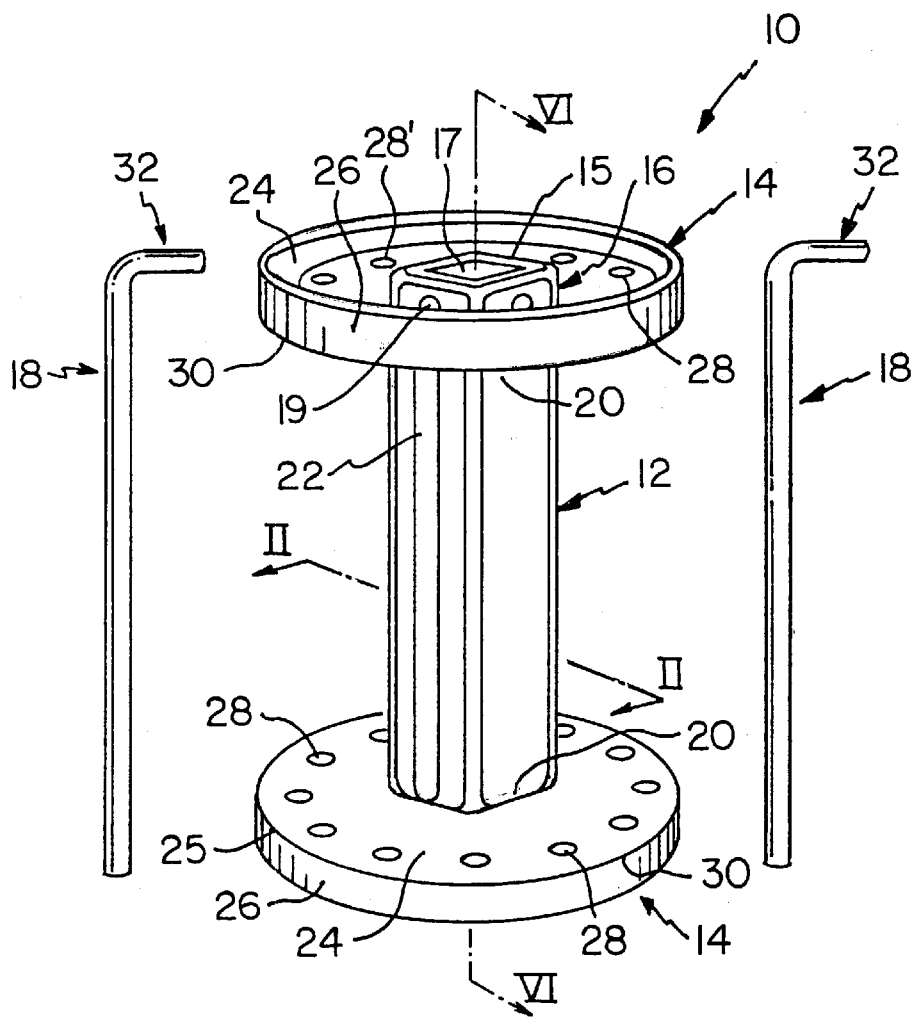
FIG. 1 is a perspective view of a spooler with two locking pins.
Figure 2:
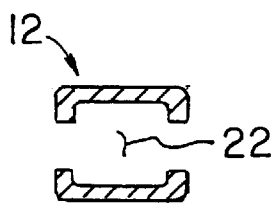
FIG. 2 is a cross-sectional view of a hub of the spooler of FIG. 1 along line II—II.

Referring to FIGS. 1–3 and 6, a spooler 10 according to the present invention includes a hub 12, a pair of discs 14, at least one drive 16, and at least one locking pin 18. The spooler 10 may be constructed of stamped steel welded together or molded or casted zinc, aluminum, or plastic (i.e., engineering grade nylon). The hub 12 is an elongated member having opposed end portions 20 and an aperture 22. The aperture 22 is configured to receive a rail 34 therethrough. The rail 34 may be any conventional continuous type fencing rail, for example, the type having plastic ensheathed metal wires or the type that is all plastic. The hub 12 may be configured in any cross-sectional shape to promote the reception of the rail 34 in the aperture 22, for example, square, hexagonal, or round.

One disc 14 is located at each end portion 20 of the hub 12. Each disc 14 is generally cup-shaped and includes a bottom 24, a rim 26, and a plurality of openings 28. The bottom 24 is preferably circular. The rim 26 extends substantially perpendicular from the bottom 24 at an outer circumference 25 or periphery of the bottom 24. A joint 30 defined by the connection of the rim 26 to the bottom 24 is preferably rounded to promote safety in handling and use. Additionally, the rounded joint 30 inhibits shaving of the plastic rail 34 during tensioning when the rail 34 is slightly misaligned in the aperture 22. The plurality of openings 28 is located near the periphery and spaced around the circumference of the bottom 24.

At least one drive 16 having an end portion 17 and wall 15 is located on one of the pair of discs 14. The rim 26 of the disc 14 extends beyond the end portion 17 of the drive 16 such that the drive 16 is recessed (shown for one end 25 of the spooler 10). Alternatively, the rim 26 of the disc 14 extends approximately the same distance as the end portion 17 such that the drive 16 is flush with the rim 26 (shown for another end 27 of the spooler 10). Injury to a person or an animal due to contact with the drive 16 is thus eliminated. A driver 40 has a driving portion 42 with a locking ball 44. The driver 40 engages the at least one drive 16 in order to rotate the spooler 10 for tensioning the rail 34. The wall 15 of the drive 16 may have a plurality of holes 19. Preferably, the wall 15 has four sides, each having a hole 19 such that the drive 16 may receive a conventional ½" drive ratchet handle. The plurality of holes 19 receives the locking ball 44 therein. This secures the driver 40 in the drive 16 to inhibit unwanted disengaging during tensioning. Preferably, a drive 16 is located on each disc 14. In this configuration, the driver 40 may conveniently engage the spooler 10 from either end or two drivers 40 may be used concurrently. The at least one drive 16 may be welded to the disc 14 and may be of a different cross-sectional configuration than the hub 12. Drive 16 may also be integral with and of the same general cross-section as the hub 12.

The at least one locking pin 18 has opposed end portions 32 and is configured to be removeably insertable into one opening of the plurality of openings 28 in each of the discs 14. In use, after the desired tension of the rail 34 is achieved, the at least one locking pin 18 is inserted into one of the plurality of openings 28 in one of the pair of discs 14. The locking pin 18 is pushed through to a corresponding opening 28 in the other of the pair of discs 14. Once installed, the at least one locking pin 18 prevents the spooler 10 from unwinding by engaging the wound fence rail. Preferably, two locking pins 18 are used. The rims 26 of the discs 14 are constructed such that when the at least one locking pin 18 is fully inserted, the rims 26 extend beyond each end portion 32 of the locking pins 18 (i.e., the at least one locking pin 18 is recessed within the discs 14). In this manner, a protruding locking pin 18 will not injure any person or animal that encounters the spooler. Additionally, in use, the spooler 10 is preferably installed vertically with one of the pair of discs 14 facing the ground and the other facing the sky. Preferably, the at least one locking pin 18 is generally L-shaped. In this situation, the at least one locking pin 18 may be first inserted into the disc 14 facing the sky and then through the disc 14 facing the ground. In such case, the L-shaped locking pin 18 needs no other pin or holding device to secure it in place.

Figure 3:
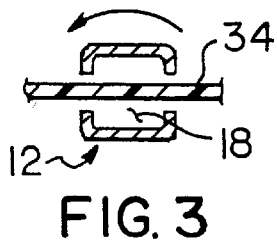
FIG. 3 is the hub of the spooler of FIG. 2 illustrating use for tensioning a rail.

Referring to FIG. 3, in use the rail 34 passes through the aperture 22 of the hub 12. The driver 40, for example, a ½" drive ratchet handle, engages the drive 16 and is used to rotate the spooler 10 until the desired tension of the rail 34 is achieved. (Alternatively, two drivers 40 may be used when a drive 16 is present on each disc 14.) Once the desired tension is achieved, the at least one locking pin 18 is inserted into one of the plurality of openings 28 in each of the pair of discs 14 to prevent unwinding of the spooler 10. Preferably, two locking pins 18 are used to lock the spooler 10 in place. Once the at least one locking pin 18 is in place, the driver 40 is removed. Since the driver 40 is removed from the spooler 10 after tensioning, an exposed driver 40 will not harm people or animals contacting the spooler 10. To relieve the tension in the rail 34, the driver 40 again engages the drive 16. The driver 40 is rotated until the tension is removed from the at least one locking pin 18, at which time the at least one locking pin 18 is removed and the rail 34 is unwound from the spooler 10.

Figure 4:
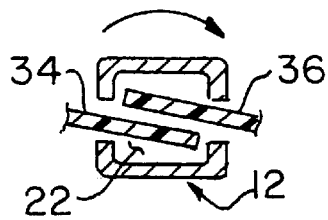
FIG. 4 is the hub of the spooler of FIG. 2 illustrating use for joining two rails.

As illustrated in FIG. 4, the spooler 10 may join two rails 34 and 36. Ends of each rail 34 and 36 are placed into the aperture 22 such that they overlap inside the aperture 22. Then, the spooler 10 is rotated, preferably one full turn, and the at least one locking pin 18 is inserted to prevent unwinding.

Figure 5:
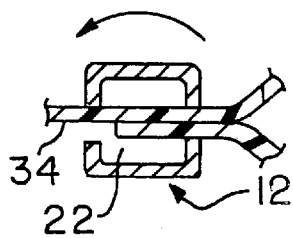
FIG. 5 is the hub of the spooler of FIG. 2 illustrating use for end post attachment.
Figure 6:
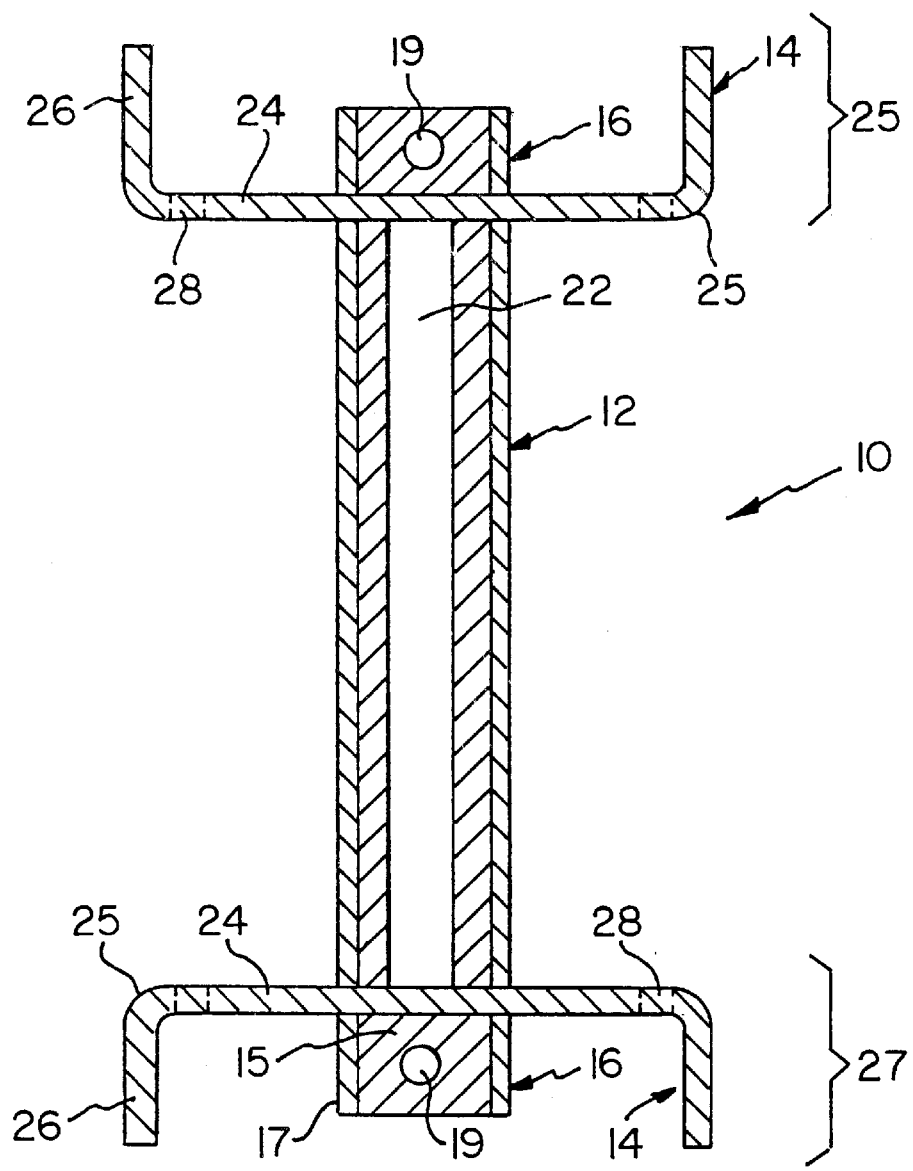
FIG. 6 is a longitudinal cross-sectional view of the spooler of FIG. 1 along line VI—VI.
Figure 7:
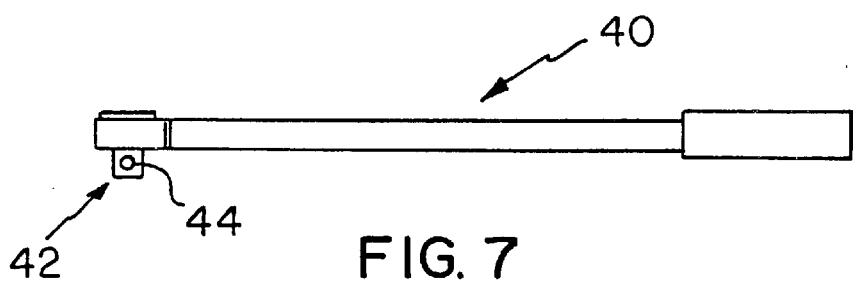
FIG. 7 is a side view of a driver.

As shown in FIG. 5, the spooler 10 may attach a rail 34 to an end post (not shown). In this use, the rail 34 is passed through the aperture 22 and wrapped around the end post. The rail 34 is then cut and passed back through the aperture 22 such that the cut end is positioned within the aperture 22. The spooler 10 is then wound and locked into place by the at least one locking pin 18.

It will be understood by those skilled in the art that while the foregoing description sets forth in detail preferred embodiments of the present invention; modifications, additions, and changes might be made thereto without departing from the spirit and scope of the invention, as set forth in the following claims.

I claim:

1. A spooler for tensioning a continuous type fencing rail, comprising:
   a hub having opposed ends and an aperture, wherein the aperture is configured to receive the rail;
   a pair of discs, each disc having a bottom containing a plurality of openings and a rim extending substantially perpendicular from an outer circumference of the bottom, wherein one disc is located at each end of the hub such that the rims of the pair of discs extend away from each other;
   at least one drive having an end portion and located on one of the pair of discs and adapted to receive a driving means, wherein the rim of the disc extends to be at least flush with the end portion of the drive; and
   at least one locking pin having opposed end portions and adapted to be removeably insertable into one opening in each disc, wherein when the at least one locking pin is fully inserted, the rims of the pair of discs extend axially beyond the ends of the at least one locking pin.

2. The spooler according to claim 1, wherein there are two drives, one drive located on each of said discs.

3. The spooler according to claim 1, wherein joints defined by the bottom and the rim of each disc are rounded.

4. The spooler according to claim 1, wherein there are two locking pins, each pin being generally L-shaped having a long portion and a short portion extending substantially perpendicular from the long portion, wherein the long portion of each pin is inserted into one opening in each disc.

5. The spooler according to claim 1, wherein the at least one drive is of a different cross-section than the cross-section of the hub.

6. The spooler according to claim 1, wherein each drive includes a plurality of holes configured to receive a locking ball on the driving means.

7. A spooler for tensioning fencing, comprising:

a hub with an aperture therethrough;

a pair of discs located at each end of the hub, each of the pair of discs being generally cup-shaped with a bottom and a rim extending from an outer circumference of the bottom, and the bottom having a plurality of openings, wherein the rims extend away from each other;

a pair of drives, each drive configured to receive a driver and located on the bottom of a corresponding disc and extending in the same general direction as the rim of the disc, wherein the rim of each disc extends to be at least flush with an end of its corresponding drive; and at least one locking pin configured to be insertable into one opening of each disc bottom, wherein the rims of the discs extend axially beyond the ends of the locking pin, when inserted.

8. A method of tensioning fencing, comprising the steps of:

inserting the fencing through an aperture in a hub of a spooler, attaching a driver to a drive located on either of a pair of cup-shaped discs of the spooler, where each disc has a bottom and a rim extending from an outer circumference of the bottom, one of the pair of discs is located at each end of the hub, and a rim of the disc having the drive extends to be at least flush with an end of the drive, using the driver to rotate the spooler to wind the fencing around the hub until the desired tension of the fencing is achieved, inserting at least one locking pin into one of a plurality of openings located on a bottom of one disc, pushing the at least one locking pin to also be inserted into a corresponding one of a plurality of openings located on a bottom of the other disc, wherein once pushed into place, a rim of each disc extends axially beyond the ends of the at least one locking pin, and removing the driver from the drive, wherein the at least one locking pin prevents unwinding of the spooler.

9. The method according to claim 8, wherein a second drive is located on the other of the pair of discs and a rim of the disc extends beyond an end of the second drive, and further including the steps of:

attaching a second driver to the second drive, and using additionally the second driver to rotate the spooler to wind the fencing around the hub until the desired tension of the fencing is achieved.

* * * * *